F. J. BRENDING.
ATTACHMENT FOR COOKING UTENSILS.
APPLICATION FILED MAR. 10, 1914.
1,153,757.
Patented Sept. 14, 1915.
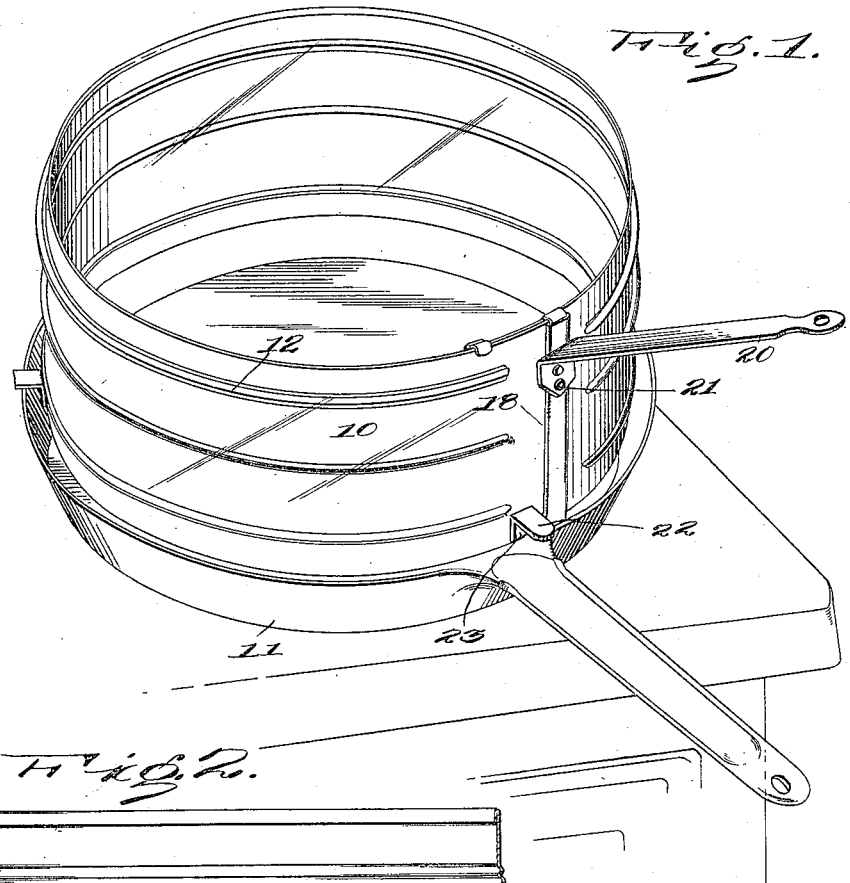
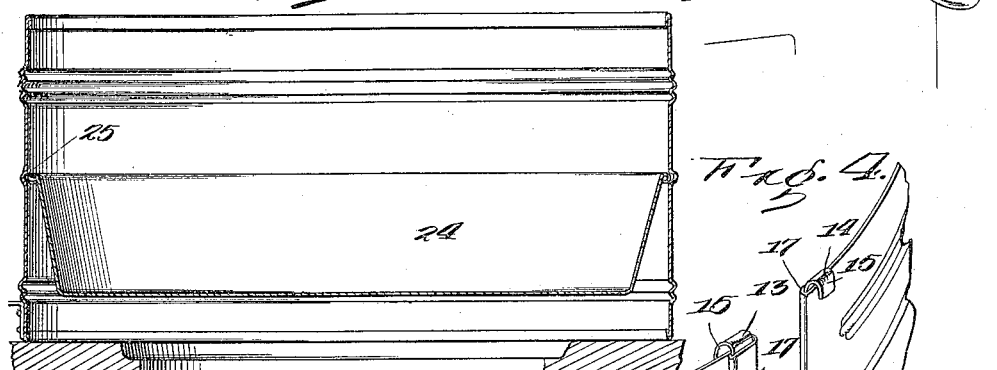
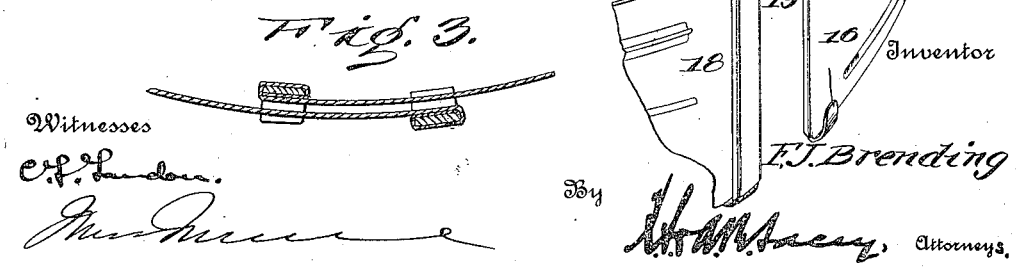

UNITED STATES PATENT OFFICE.

FREDERICK J. BRENDING, OF BRAINERD, MINNESOTA.

ATTACHMENT FOR COOKING UTENSILS.

1,153,757.   Specification of Letters Patent.   Patented Sept. 14, 1915.

Application filed March 10, 1914. Serial No. 823,716.

*To all whom it may concern:*

Be it known that I, FREDERICK J. BRENDING, citizen of the United States, residing at Brainerd, in the county of Crow Wing and State of Minnesota, have invented certain new and useful Improvements in Attachments for Cooking Utensils, of which the following is a specification.

This invention relates to new and useful improvements in attachments for cooking utensils, and has particular reference to that type of attachments known as pan shields or jackets.

The principal object of my invention is to provide an annular sheet metal body member which may be employed as an auxiliary rim for increasing the depth of a cooking utensil, such as a frying pan, baking pan, pie pan, or the like, by being removably positioned on the upper edge thereof.

A further object is to construct the shield or auxiliary rim in such manner that its diameter may be increased or decreased at the will of the operator, whereby the shield will conform to cooking utensils of various sizes.

An object of equal importance with the foregoing is to so construct the shield that it may also serve as a support or base for a baking pan or the like, so that the pan may be quickly converted for use as a frying pan or skillet of more than ordinary depth, and may be supported above the burner or fire hole of the stove.

A still further object is to provide a novel form of clamping means whereby the meeting terminals of the annular body member may be held in adjusted position after having been moved one over the other in the act of adjusting the shield to a certain sized pan.

A still further object is to provide a device of the character set forth which, while adapted for many uses, is simple in its construction, may be cheaply manufactured, and will be durable and efficient in its action, being capable of quick application to or removal from all ordinary forms of utensils.

The above and additional objects are accomplished by such means as are illustrated in the accompanying drawings, described in the following specification, and then more particularly pointed out in the claims which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a perspective view showing the pan shield in operative assembled position on a frying pan; Fig. 2 is a vertical section taken diametrically through the shield showing it in connection with a baking pan; Fig. 3 is a horizontal section taken through the wall of the shield, illustrating in detail the clamping members which are employed in holding the terminals of the shield in the desired adjusted position; Fig. 4 is a detail fragmentary view, illustrating the terminals of the shield in disassembled relation.

Proceeding now to the description of the drawings and referring particularly to Fig. 1, in which the invention is illustrated in connection with a frying pan, the numeral 10 designates as an entirety the body of the shield member while the numeral 11 designates the frying pan which may be of any convenient type and does not form any part of the present invention. In this connection it is desired to direct particular emphasis to the fact that the shield of the present invention may be efficiently employed in connection with almost any type of cooking utensil without requiring any alteration in its construction.

The body 10 of the shield is constructed from an elongated substantially oblong sheet of metal, tin being preferably used, although any other suitable metal may be employed if found desirable. The metal sheet from which the member 10 is constructed is pressed or stamped in the well known manner to produce a number of longitudinally extending parallel corrugations or beads indicated at 12. It will be seen on reference to Fig. 1 that these corrugations form on the inner face of the member 10, when it has been bent into the annular form shown in Fig. 1, a series of parallel channels, and that they, at the same time, produce on the outer face of the body member a number of parallel ribs. The purpose in thus shaping the body member 10 is to provide an effective joint when the terminals of the member 10 are engaged in the manner shown in the drawings.

As stated, the meeting terminals of the member 10 are adapted to slide one upon the other so that the diameter of the shield may be increased or decreased at the will of the operator to conform in size to the rims of cooking utensils of various kinds and sizes. In holding the meeting terminals of the body member or band 10, the present invention preferably employs a pair of clamping devices which are applied to the terminals of the member 10 as indicated at 13 and 14 in Fig. 4. Each of these clamping members consists in an elongated strip of metal, the terminals of which are bent toward one another, forming the clamping lips or hooks 15 and 16. The main body portion of each of the members 13 and 14 is held in proper position on the terminal of the band to which it is applied by rolling the terminal of the band to provide an envelop or casing indicated at 17.

The members 15 and 16 of the individual clamping members 13 and 14 are, when the devices have been properly applied to the meeting terminals of the pan, disposed oppositely with respect to one another. The members 15 and 16 of the clamping plate 14 engage over the upper and lower edges of the adjacent terminal 18 of the member 10 and are disposed exteriorly of the shield as will be plainly seen upon reference to Fig. 1. The hook members 15 and 16 of the clamping devices 13 are similarly applied to the terminal 19 of the member 10 and are disposed interiorly of the shield as will also be apparent upon reference to Fig. 1.

From the foregoing description it will be readily appreciated that the user of the shield may quickly change the diameter of the shield by sliding the terminals 18 and 19 one upon the other and that when the terminals have been properly adjusted, they will be held against accidental shifting by reason of the fact that the body member 10 naturally tends to straighten itself out and as a result, the terminals 18 and 19 will bind in opposite directions on the gripping lips 15 and 16 of the two members 13 and 14. The exteriorly disposed terminal 18 of the shield member is equipped with a handle indicated at 20. This handle is riveted or otherwise secured by fastening devices 21 to the members 17 in the manner best shown in Fig. 1.

The lower edge of the shield carries a number (preferably three, although a greater number may be employed, if desired) of L-shaped bracket members as shown at 22. One leg of each of these brackets is riveted or otherwise secured as at 23 to the outer side of the band member 10 and at the lower edge so that the longer leg of each bracket will extend laterally from the shield. It is thus possible, as in Fig. 1, to quickly position the shield in the proper relation to the frying pan or other utensil by arranging the lower edge of the shield interiorly of the rim of the utensil and resting the horizontal legs of the brackets 22 on the rim of the utensil. These bracket members 22 also serve a further purpose for they may be employed in properly supporting the shield in the stove hole. Fig. 2 shows a further application of the shield for it will be seen that a baking pan, indicated at 24, is arranged within the shield and is clamped against accidental displacement therefrom by the insertion of the peripheral bead 25, such as is customarily formed on baking pans and similar cooking utensils, in one of the channels formed on the inner face of the shield 10 by the beads 12, as has been hereinbefore explained. By properly adjusting the terminals 18 and 19 of the shield body, it will be obvious that the baking pan will be securely held therein and that the shield, as well as forming an auxiliary rim which increases the depth of the baking pan, serves to properly support the pan over the fire hole of the stove.

Before concluding the description of the drawings, it is desired to call attention to several of the important advantages resulting from the novel structure employed in my invention. One of the principal advantages claimed is that the shield is adapted for a two-fold usage. It may be employed solely as an auxiliary rim for a cooking utensil by being properly positioned on the upper edge thereof or may be utilized both, as an auxiliary rim for increasing the depth of the cooking utensil, and as a base for properly supporting the utensil over the fire hole of a stove. In this connection, it may be well to explain that when the shield of my invention is used on a gas stove, the lower edge of the shield is, of course, mounted on a burner to surround the flame and there is thus formed a housing which will confine the heat and insure a thorough and uniform cooking of the contents of the utensil. A further advantage obtained in employing my shield in connection with various forms of cooking utensils is that it will prevent the spattering of grease when meats, vegetables or the like are being fried.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desired to emphasize the fact that various minor changes in details of construction, proportion and arrangement of parts may be resorted to, when required, without sacrificing any of the advantages of this invention, as defined in the appended claims.

Having thus described the invention, what is claimed as new is:

1. An attachment for cooking utensils including an extensible body member formed from a continuous sheet of resilient metal, the terminals of which overlap and are adapted to slide one above the other, whereby the member may be expanded or contracted, and coacting clamping members carried by the terminals of the body member, each clamping member being engageable with the opposed terminal of the body member for holding the terminals in adjusted position, each of said clamping members consisting of a metal bar having terminally formed hooks adapted to embrace the upper and lower edges of the body member terminals, the terminal portions of the body member being rolled to embrace the intermediate portion of the bar members for securing the bar members in position.

2. An attachment for cooking utensils including a flexible body member having its extremities overlapped, transversely extending strips supported terminally of the member, the extremities of the member being rolled to embrace said strips and the extremities of the strips projecting laterally beyond opposite side edges of the member, the laterally directed terminals of each of said strips being bent toward each other to provide hooks freely embracing the side edges of the member, and a series of transversely spaced annular sockets formed in the said member and each adapted to receive a terminal flange of a cooking utensil.

3. In a device of the character described, the combination with an extensible body member having its terminals adjustably connected, of a series of transversely spaced annular sockets formed in the body member, and means carried by the body member and projecting laterally therefrom in a plane below and upon one side of said series, the said means being adapted to engage the peripheral edge of a cooking utensil with the said body member disposed within the utensil and each of said sockets being adapted to engage the terminal flange of a cooking vessel whereby the body member will support the cooking vessel within the said utensil and in spaced relation thereto.

In testimony whereof I affix my signature in presence of two witnesses.

FRED. J. BRENDING. [L. S.]

Witnesses:
 MILTON McFADDEN,
 G. W. CHADBOURNE.

Copies of this patent may be obtained for five cents each, by addressing the "Commissioner of Patents, Washington, D. C."